United States Patent Office 2,713,642
Patented July 19, 1955

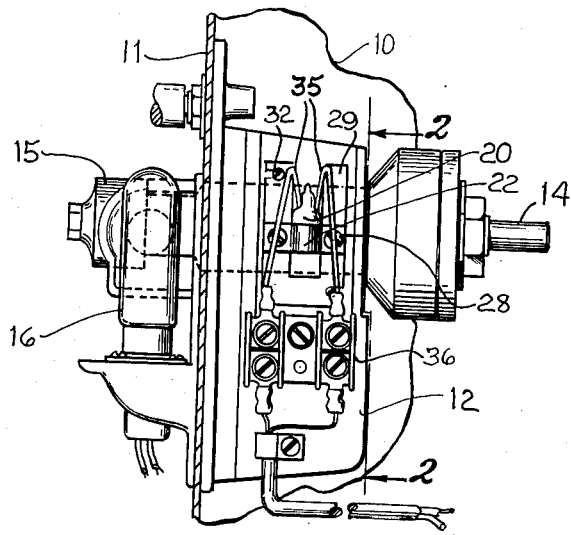
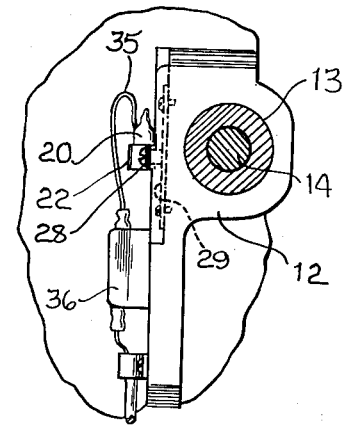
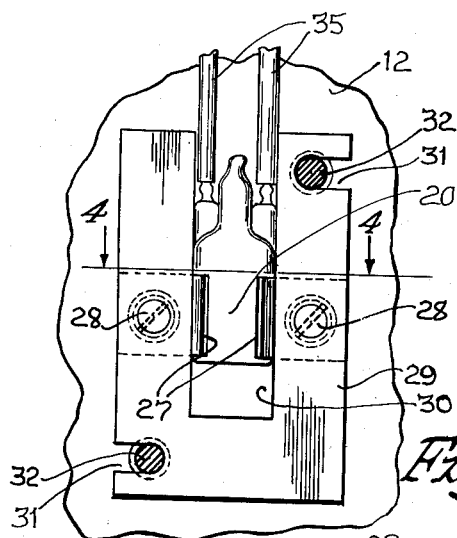
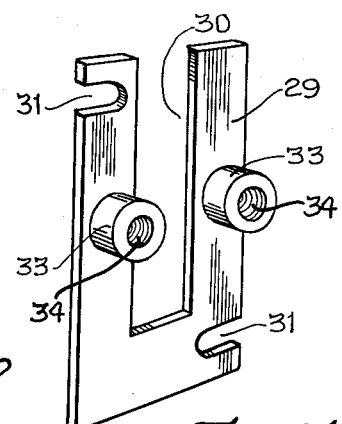
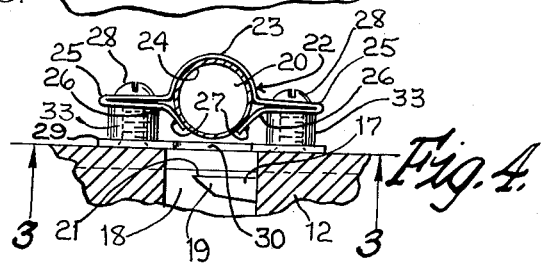

2,713,642

MOUNTINGS FOR PHOTO-CELLS FOR USE IN CONNECTION WITH A SOUND REPRODUCING MOTION PICTURE PROJECTING APPARATUS

John S. Powers and John W. Lang, Jr., Chicago, Ill., assignors to De Vry Corporation, Chicago, Ill., a corporation of Illinois Application November 30, 1950, Serial No. 198,352

3 Claims. (Cl. 250—200)

This invention relates to certain new and useful improvements in mountings for photo-cells for use in connection with a sound reproducing motion picture projecting apparatus.

The invention is particularly useful in assembling the photo-cell with its center in proper alignment with the scanning area of a light shaft or tube such as is disclosed in Letters Patent No. 2,617,892, dated November 11, 1952 on a Light Transmission Mechanism.

The invention has as a principal object a novel and simple arrangement whereby a photo-cell is supplied with a mounting bracket permanently secured thereto in a predetermined position on the cell so that when the bracket is secured to its mounting plate on the sound reproducing apparatus a correct alignment between the photo-cell and the scanning area of the light shaft or tube is assured, requiring no adjustment of the several parts by the installer.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a fragmentary sectional side elevational view of a sound reproduction motion picture projecting apparatus showing our improved photo-cell mounting associated therewith;

Fig. 2 is a fragmentary sectional detail view taken substantially on line 2—2 of Fig. 1;

Fig. 3 is an enlarged elevational view of the photo-cell mounting taken substantially on line 3—3 of Fig. 4;

Fig. 4 is a fragmentary sectional detail view taken substantially on line 4—4 of Fig. 3; and Fig. 5 is an enlarged perspective view of a mounting plate embodied in the invention.

Referring more particularly to the drawings wherein we have illustrated the preferred form of construction for carrying our invention into effect a fragmentary portion of a motion picture apparatus is shown at 10. It includes a wall 11. On this wall 11 there is assembled in any suitable manner a bearing block 12 having projected therethrough a housing 13 in which is journaled a driven shaft 14 having at one end portion a sound drum 15 arranged adjacent an exciter lamp 16, the beam of light from which is projected through a light transmitting shaft 17 carried by the housing 13 in a manner substantially similar to that shown in the hereinbefore referred to Letters Patent No. 2,617,892. In the block 12 is an opening 18 exposing the scanning end portion 19 of the shaft 17.

For the best sound reproduction performance it is highly desirable that the photo-cell 20 have accurate center alignment with the scanning area 21 of the end portion 19 of the shaft 17. Prior to our invention, to accomplish this result it was necessary for the operator to apply various tests when replacing a burned out or defective cell in order to properly align the cell with the scanning area.

As hereinbefore indicated our invention has as a principal object an arrangement whereby the photo-cell is permanently secured at the factory to a mounting bracket in a predetermined position which position is its proper position with respect to a scanning area 21 when the cell is mounted in position. This eliminates any manual adjustment of the cell by the operator at the time of installation.

To accomplish the foregoing object we provide a mounting bracket 22 comprising a semi-circular portion 23 which envelopes the outer surface 24 of the cell. Extending from this medial portion 23 are lateral extensions 25 having returned bend portions 26 with their end portions 27 yieldably bearing upon the side of the cell 20 opposite the side thereof enveloped by the medial portion 23. After the cell has been properly positioned in a predetermined position within the holder therefor provided by the medial portion 23 and the return bend portions 26, the cell is fixedly secured in such predetermined position by a proper adhesive, such as sealing wax or the like.

The lateral extensions 25 are perforated for the projection of mounting screws 28. A mounting plate 29 is provided with an open slot 30. There is formed in the mounting plate 29 reversely extending slots 31 through which project mounting screws 32 for securing the plate 29 upon the bearing 12 with the slot 30 in proper alignment with the opening 18.

On opposite sides of the slot 30 the plate 29 provides spaced bosses 33 provided with threaded bores 34 and into which the mounting screws 28 are threaded.

By reason of the fixed relationship between the bracket and the photo-cell 24, when the bracket is secured to the mounting plate 29 the photo-cell will be in proper and accurate alignment with the scanning area 21. In thus mounting the photo-cell in position with respect to the plate 29 no adjustment of the photo-cell is necessary relative to its mounting bracket because of the fact that the position of the photo-cell in its bracket has been previously determined.

Each cell when sold is equipped with its individual mounting bracket. This arrangement assures that the photo-cell will be properly aligned with respect to the scanning area of the light shaft or tube 17.

In Fig. 1 of the drawings, the cover for the photo-cell has been omitted in order that the photo-cell and its mounting may be readily observed. The circuit wires 35 from the cell are connected to a terminal block 36 mounted on the bearing 12.

The photo-cell mounting comprises relatively few parts and may be assembled with the minimum degree of labor and cost.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claims.

Having thus described our invention, what we claim as new and desire to protect by Letters Patent is:

1. In combination, a mounting plate having a slot formed therein, said plate provided on one side thereof with laterally extending bosses intermediate the ends thereof and in corresponding relation to either side of said slot, said mounting plate having on its opposite sides and ends reversely extending locating slots for the locating of the plate on the stationary wall, a photo-cell adapted to be mounted on said plate adjacent said slot between said bosses, a mounting bracket fixed to the photo-cell in a predetermined position, said bracket having a medial portion embracing one side of the photo-cell and lateral extensions having return bends embracing a portion of the opposite side of the photo-cell, said lateral extensions being perforated for the projection of mounting screws therethrough and into said bosses for connecting said bracket to said plate.

2. In combination, a mounting plate having a center slot formed therein, said plate provided on one side thereof with laterally extending bosses intermediate the ends thereof and in corresponding relation to either side of said slot, a photo-cell adapted to be mounted on said plate adjacent said slot, a mounting bracket secured to the photo-cell in a predetermined position, said bracket having a medial portion embracing one side of the photo-cell and lateral extensions having return bends embracing a portion of the opposite side of said photo-cell, said lateral extensions adopted to be positioned over said bosses and being correspondingly perforated adjacent said embracing portions for the projection of mounting screws therethrough and into said bosses for connecting said bracket to said plate between said bosses so the photo-cell is in alignment with the slot of said plate.

3. In combination, a mounting plate having a center slot formed therein, said plate provided on one side thereof with laterally extending bosses intermediate the ends thereof and in corresponding relation to either side of said slot, said plate having on its opposite sides and ends reversely extending locating slots for the locating of the plate on a stationary wall, a photo-cell adapted to be mounted on said plate between said bosses adjacent said center slot, a mounting bracket fixed to the photo-cell in a predetermined position, said bracket having a medial portion embracing one side of the photo-cell and lateral extensions having return bends embracing a portion of the opposite side of said photo-cell, said lateral extensions adapted to be positioned over said bosses and being correspondingly perforated adjacent said embracing portions for the projection of mounting screws therethrough and into said bosses for connecting said bracket to said mounting plate between said bosses so the photo-cell is in alignment with the center slot of said plate.

References Cited in the file of this patent
UNITED STATES PATENTS

| | | |
|---|---|---|
| 1,547,014 | Bantel | July 21, 1925 |
| 2,000,425 | Strauss | May 7, 1935 |
| 2,073,223 | Rose | Mar. 9, 1937 |
| 2,229,782 | White | Jan. 28, 1941 |
| 2,359,808 | Thompson | Oct. 10, 1944 |
| 2,617,892 | Powers | Nov. 11, 1952 |
| 2,625,360 | Hall | Jan. 13, 1953 |